United States Patent
Kitamura

(10) Patent No.: US 9,950,874 B2
(45) Date of Patent: Apr. 24, 2018

(54) ARTICLE SUPPLY DEVICE FOR INDIVIDUALLY SUPPLYING ARTICLES

(71) Applicant: FANUC CORPORATION, Minamitsuru-gun, Yamanashi (JP)

(72) Inventor: Ryouji Kitamura, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 17 days.

(21) Appl. No.: 14/835,824

(22) Filed: Aug. 26, 2015

(65) Prior Publication Data

US 2016/0060047 A1 Mar. 3, 2016

(30) Foreign Application Priority Data

Aug. 27, 2014 (JP) ................. 2014-172959

(51) Int. Cl.
| | |
|---|---|
| B07B 13/05 | (2006.01) |
| B65G 47/52 | (2006.01) |
| B65G 47/90 | (2006.01) |
| B65G 47/80 | (2006.01) |
| B65G 47/91 | (2006.01) |

(52) U.S. Cl.
CPC .......... *B65G 47/525* (2013.01); *B65G 47/80* (2013.01); *B65G 47/90* (2013.01); *B65G 47/91* (2013.01); *B07B 13/05* (2013.01); *B65G 2203/041* (2013.01)

(58) Field of Classification Search
CPC .............. B65G 47/1428; B65G 47/525; B65G 47/8815; B65G 47/80; B65G 2203/041; B65G 57/00; B65G 57/06; B07B 13/05

USPC .... 198/348, 434, 443, 445, 451, 452, 465.1, 198/793, 800; 209/658, 661
See application file for complete search history.

(56) References Cited

U.S. PATENT DOCUMENTS

| | | | | |
|---|---|---|---|---|
| 2,701,638 A * | 2/1955 | Petro | ................. | B65G 47/766 209/550 |
| 3,750,882 A * | 8/1973 | Hays | .................. | B07C 5/342 198/341.03 |
| 8,322,515 B2* | 12/2012 | Rausch | ............... | B65G 47/086 198/436 |
| 2011/0036684 A1* | 2/2011 | Bonnain | ............... | B65B 21/06 198/418.7 |

FOREIGN PATENT DOCUMENTS

| | | |
|---|---|---|
| JP | 60204518 A | 10/1985 |
| JP | 08323669 A | 12/1996 |
| JP | A 11-300670 | 11/1999 |
| JP | B 3876260 | 1/2007 |

* cited by examiner

*Primary Examiner* — Anna M Momper
*Assistant Examiner* — Ronald P Jarrett
(74) *Attorney, Agent, or Firm* — RatnerPrestia

(57) ABSTRACT

An article supply device includes a storage unit in which a plurality of articles are stored, a supply path, a partition/passing-through member that forms a predetermined gap between a surface of the supply path and the partition/passing-through member, a driving unit that allows the supply path and the partition/passing-through member to relatively move each other, and a gas injection unit that injects gas to the articles on the supply path in at least one of the upstream and the downstream of the partition/passing-through member.

7 Claims, 9 Drawing Sheets

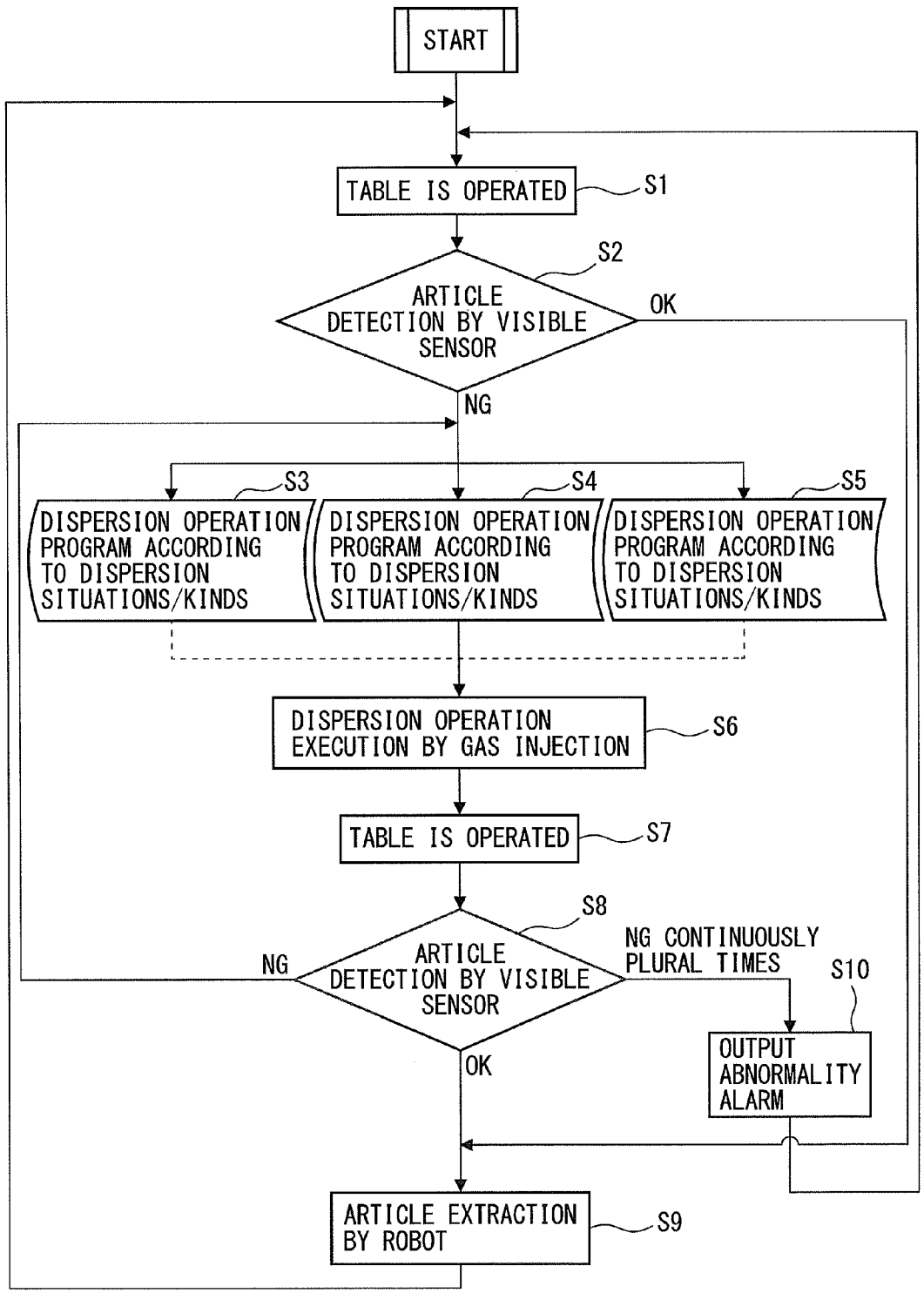

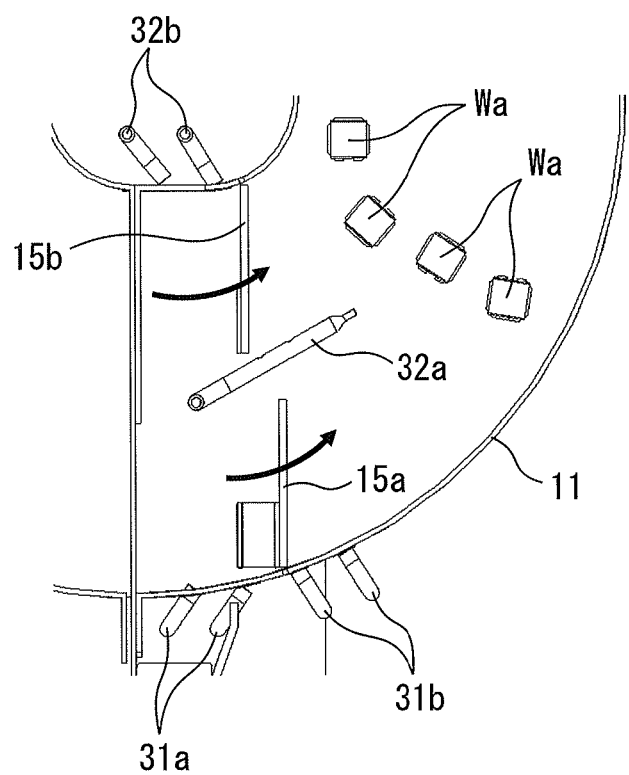

ARTICLE SUPPLY DEVICE FOR INDIVIDUALLY SUPPLYING ARTICLES

BACKGROUND OF THE INVENTION

1. Technical Field

The present invention relates to an article supply device that individually extracts articles by using a visible sensor and a robot and supplies the articles to a supply destination.

2. Description of Related Art

For example, in an assembly factory and the like, it is common that a robot grasps one of a plurality of articles on the basis of a visual sensor and supplies the article to a next supply destination. Japanese Registered Patent Publication No. 3876260 discloses a device including a rotatable table having a mounting surface on which a plurality of articles are placed, and a partition/passing-through member that forms a gap of a predetermined distance between the mounting surface of the table and the partition/passing-through member. When the table and the partition/passing-through member relatively move with each other and thus an article passes through the gap, the visual sensor detects the article. Then, the robot grasps the article on the basis of information of the visual sensor and supplies the article to a supply destination.

Moreover, Japanese Laid-open Patent Publication No. 11-300670 discloses that when a plurality of articles are meshed with one another on a table, the plurality of articles are allowed to vibrate or gas is injected to the plurality of articles, so that these articles are prevented from being meshed with one another.

However, in Japanese Registered Patent Publication No. 3876260, there is a case in which articles mesh with other articles according to the shapes of articles and these articles overlap one another. In such a case, the plurality of meshed articles may be clogged in a gap between the table and the partition/passing-through member. Furthermore, it is difficult for the robot to grasp the meshed articles. Therefore, a cycle time is delayed Moreover, in Japanese Laid-open Patent Publication No. 11-300670, when the plurality of articles are allowed to vibrate, since the articles and the table are rubbed together, the surfaces and the like of the articles may be damaged. Moreover, even in the case of injecting gas, articles may be meshed with one another according to the position and the orientation of an injection port through which the gas is injected. In such a case, it is necessary to change the position and the orientation of the injection port so as to inject the gas again, resulting in the delay of a cycle time.

Therefore, it is an object of the present invention to provide an article supply device capable of supplying articles in a short cycle time without damaging the articles and meshing of the articles.

SUMMARY OF INVENTION

According to a first aspect in order to achieve the above-mentioned object, there is a provided an article supply device including a storage unit (12) in which a plurality of articles are stored, a supply path (13) that communicates with the storage unit, a partition/passing-through member (15) that forms a predetermined gap between a surface of the supply path and the partition/passing-through member, a driving unit (17) that allows the supply path and the partition/passing-through member to relatively move each other, and a gas injection unit (36) that injects gas to the articles on the supply path in at least one of upstream and downstream of the partition/passing-through member in a supply direction of the articles.

According to a second aspect, in the first aspect, at least one of positions and orientations of the articles supplied to the downstream of the partition/passing-through member is detected by a visible sensor (30).

According to a third aspect, in the first or second aspect, the articles supplied to the downstream of the plurality of partition/passing-through members are extracted by a robot (20).

According to a fourth aspect, in the first aspect, a timing at which the gas injection unit injects the gas is controlled by a timer (41).

According to a fifth aspect, in the second aspect, a timing at which the gas injection unit injects the gas is controlled by a visible sensor that detects at least one of positions and orientations of the articles supplied to the downstream of the partition/passing-through member.

According to a sixth aspect, in the first aspect, the supply path is configured to be circular.

According to a seventh aspect, in the first aspect, the driving unit is a servo motor.

These objects, features, and advantages of the present invention and other objects, features, and advantages will be better understood from the following detailed description of an exemplary embodiment of the present invention illustrated in the accompanying drawings.

BRIEF DESCRIPTION OF DRAWINGS

FIG. 5 is a flowchart illustrating an operation of an article supply device based on the present invention.

FIG. 6C is a third top view of a supply path.

DETAILED DESCRIPTION

Figure 1:
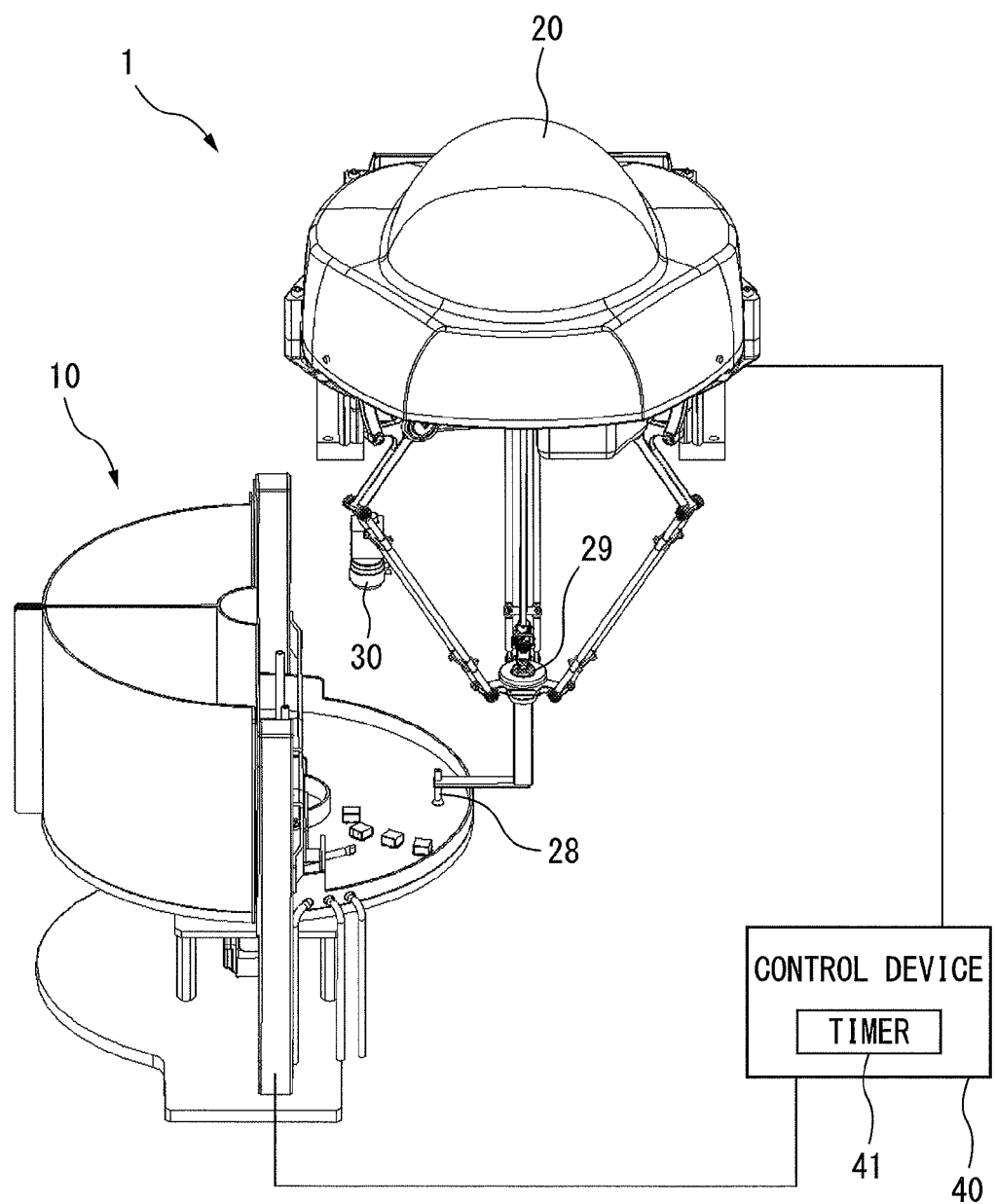
FIG. 1 is a perspective view of a system including an article supply device based on the present invention.

Hereinafter, an embodiment of the present invention will be described with reference to the accompanying drawings. In the following drawings, the same reference numerals are used to designate the same members. In order to facilitate understanding, the scales of these drawings have been appropriately changed.

FIG. 1 is a perspective view of a system including an article supply device based on the present invention. As illustrated in FIG. 1, a system 1 includes an article supply device 10, a robot 20, and a control device 40 that controls the article supply device 10 and the robot 20. In the present invention, it is assumed that a member 28 mounted in a movable unit 29 of the robot 20 grasps an article supplied from the article supply device 10 and supplies the article to another place.

The robot 20 illustrated in FIG. 1 is a parallel link robot that displaces the movable unit 29 by driving three arms below a base. However, other types of robots, for example, a vertical articulated robot may also be used as the robot 20.

Furthermore, a visible sensor 30 is mounted in the robot 20. The visible sensor 30 may be a CCD camera, or a combination of the CCD camera and a projector. The control device 40 illustrated in FIG. 1 is a digital computer and drives the article supply device 10 according to a predetermined program. Furthermore, the control device 40 drives the robot 20 on the basis of information from the visible sensor 30. As illustrated in FIG. 1, the control device 40 includes a timer 41. The timer 41 may also be directly connected to a gas injection unit 36 to be described later.

Figure 2:
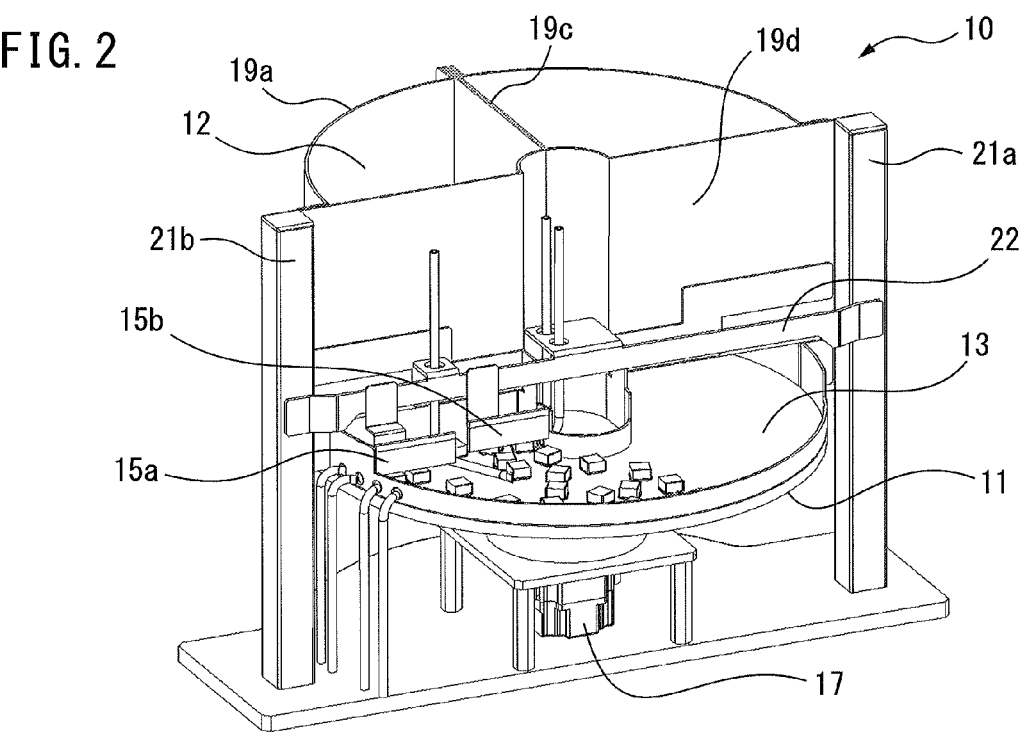
FIG. 2 is a perspective view of an article supply device based on the present invention.
Figure 3:
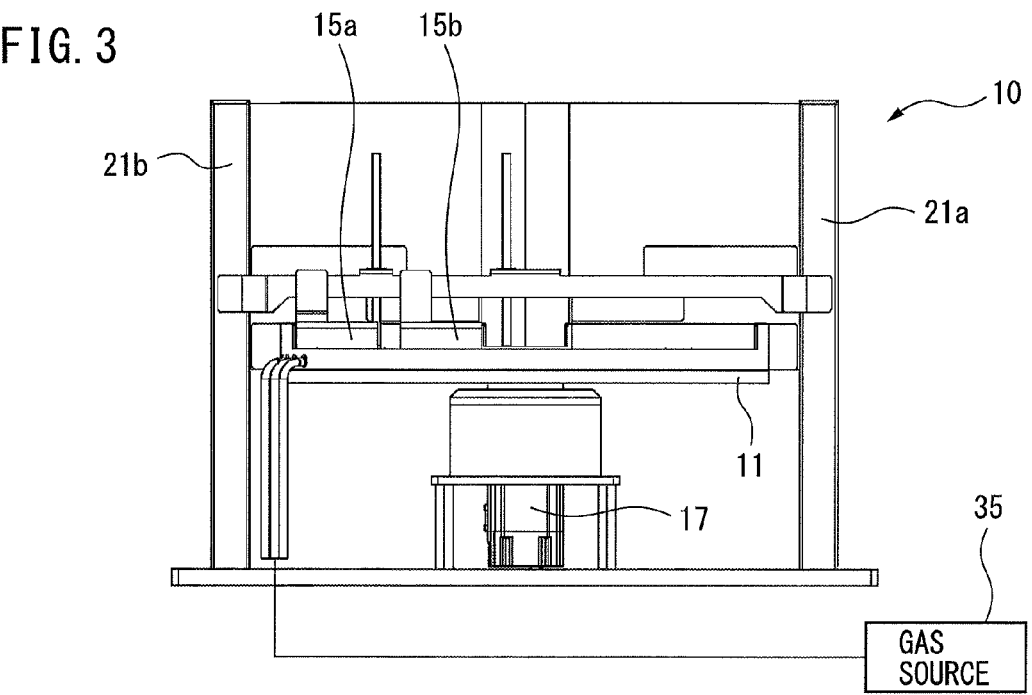
FIG. 3 is a side view of an article supply device illustrated in FIG. 2.
Figure 4:
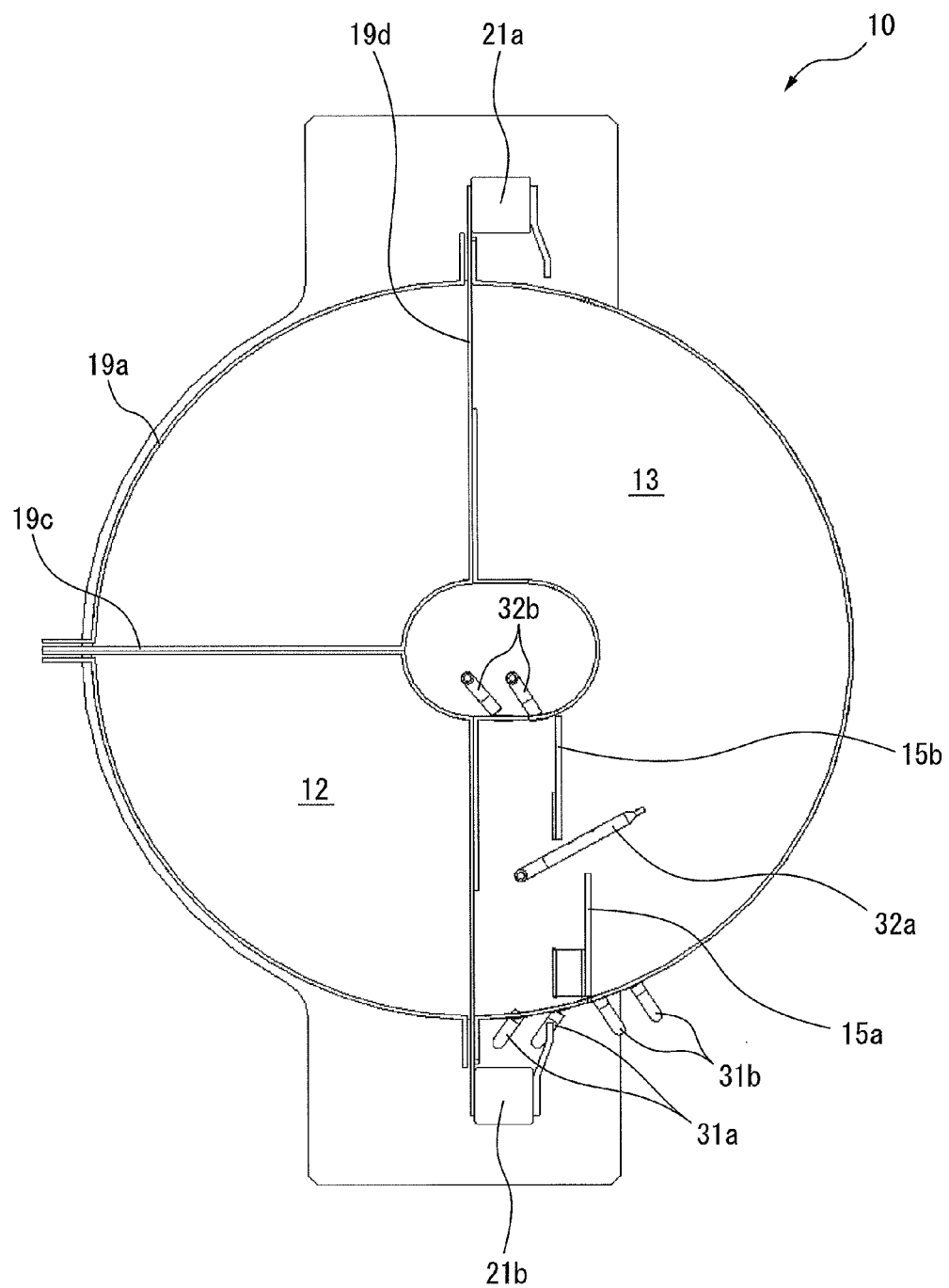
FIG. 4 is a sectional view of an article supply device illustrated in FIG. 2.

FIG. 2 is a perspective view of the article supply device based on the present invention, and FIG. 3 is a side view of the article supply device illustrated in FIG. 2. Moreover, FIG. 4 is a sectional view of the article supply device illustrated in FIG. 2. As illustrated in these drawings, the article supply device 10 has a circular table 11. An upper surface of the table 11 is a mounting surface on which a plurality of articles are placed.

The table 11 is rotated around a central axis of the table 11 by a driving motor 17 disposed on a lower surface thereof, for example, a servo motor. Since the servo motor is used, a rotation position of the table 11 is accurately controlled and the table 11 is rotated at a high speed. In addition, the table 11 is rotated both clockwise and counterclockwise. However, in the following description, the table 11 is assumed to be rotated counterclockwise.

As apparent from FIG. 2, two struts 21a and 21b are installed adjacent to the table 11, and a beam 22 extending in a diametrical direction of the table 11 connects apexes of these struts 21a and 21b to each other. Moreover, the beam 22 is mounted at one side thereof with a semicircular surrounding member 19a having a radius approximately equal to that of the table 11.

As apparent from FIG. 4, the surrounding member 19a and the table 11 are concentrically disposed. Furthermore, a partition plate 19c extending vertically with respect to the beam 22 (not illustrated in FIG. 4) crosses the surrounding member 19a. The surrounding member 19a is assumed to extend downward just before an outer edge of the table 11.

As a consequence, the surrounding member 19a and a mounting plate 19d, which is mounted at one side of the struts 21a and 21b form a semicircular storage unit 12. In addition, preferably, a distance between a lower end of the partition plate 19c and the surface of the table 11 is sufficiently larger than an external dimension of an article to be described later. Furthermore, in order to easily view the interior of the storage unit 12, the surrounding member 19a and the partition plate 19c are preferably made of a transparent resin plate and the like.

In the storage unit 12, a plurality of articles may be stored. Preferably, one kind of articles are stored in the storage unit 12. A plurality of articles are randomly stacked and stored in the storage unit 12. In FIG. 4, at the other side of the beam 22, a supply path 13 is illustrated on the mounting surface of the table 11. The supply path 13 communicates with the storage unit 12. As illustrated in FIG. 4, the supply path 13 has an arc shape including the outer edge of the table 11.

Referring again to FIG. 2, at the other side of the beam 22, a first partition/passing-through member 15a and a second partition/passing-through member 15b are respectively disposed. As illustrated in FIG. 2, it is assumed that these partition/passing-through members 15a and 15b are mounted in the beam 22.

These partition/passing-through members 15a and 15b are mounted so that a lower edge thereof forms a gap having a predetermined size between each of these partition/passing-through members 15a and 15b and the mounting surface of the table 11. The size (the height) of the gap is decided as a value by which articles pass through little by little according to the rotation of the table 11 and are dispersed as illustrated in the drawing. In the present invention, it is assumed that the gaps between the first partition/passing-through member 15a/the second partition/passing-through member 15b and the surface of the table 11 are equal to each other.

At the time of an operation, the table 11 is rotated counterclockwise. In this way, a plurality of articles stored in the storage unit 12 pass through each of the partition/passing-through members 15a and 15b little by little, for example, one by one, and are supplied to the downstream of these partition/passing-through members 15a and 15b.

Referring again to FIG. 1, when the visible sensor 30 detects articles having passed through each of the partition/passing-through members 15a and 15b, at least one of the type, the positions, and the orientations of such articles is supplied to the control device 40. Then, on the basis of such information, the control device 40 operates the robot 20, so that the member 28 of the robot 20 grasps one article. Next, the robot 20 conveys the article to a next supply destination.

FIG. 5 is a flowchart illustrating an operation of the article supply device based on the present invention. This flowchart illustrates a one-time operation in which the robot 20 grasps an article and extracts the article from the article supply device 10. At the time of start of the procedure illustrated in FIG. 5, it is assumed that a plurality of articles have been stored in the storage unit 12. Hereinafter, the operation of the article supply device based on the present invention will be described with reference to these drawings.

Firstly, in step S1, the driving motor 17 is driven, so that the table 11 is rotated in a predetermined direction, for example, counterclockwise, by a predetermined amount. In this way, the articles Wa pass through the first and second partition/passing-through members 15a and 15b little by little, respectively.

Then, in step S2, the visible sensor 30 detects one article Wa of the articles Wa having passed through the partition/passing-through members 15a and 15b. When the kind, the position, the orientation and the like of an article are normally detected by the visible sensor 30, the procedure proceeds to step S9. In step S9, the robot 20 is operated on the basis of the detection result of the visible sensor 30, thereby grasping an article and conveying the article to a next supply destination.

In the present invention, the visible sensor 30 detects the kind, the position, the orientation of an article, so that it is possible to exclude a mechanism for positioning an article. Consequently, in the present invention, it is possible to simplify the entire configuration of the system 1. Furthermore, since articles are grasped using the robot 20, even though the extraction positions and orientations of the articles are changed according to articles, it is possible to flexibly cope with such a change.

In this connection, there is a case in which when a plurality of articles are supplied while being brought into contact with one another or being adjacent to one another, the visible sensor 30 is not able to correctly detect individual articles. Furthermore, there is a case in which articles mesh with other articles according to the shapes of articles and these articles overlap one another. Also in such a case, the visible sensor 30 is not able to correctly detect individual articles. Moreover, a plurality of meshed articles may be clogged in the gaps between the partition/passing-through members 15a and 15b and the table 11. In the present invention, in order to solve such a problem, gas is injected to a plurality of objects brought into contact with one another or adjacent to one another and a plurality of meshed objects so as to disperse the plurality of objects and release the meshing, so that the visible sensor 30 normally operates.

Referring again to FIG. 4, four nozzles 31a and 31b are sequentially disposed at an outer peripheral portion of the supply path 13. As apparent from FIG. 4, the two nozzles 31a are disposed toward the first partition/passing-through member 15a at the upstream of the first partition/passing-through member 15a. The other two nozzles 31b are disposed toward the first partition/passing-through member 15a at the downstream of the first partition/passing-through member 15a.

Moreover, two nozzles 32b are sequentially disposed on an inside inner peripheral surface of the supply path 13. These nozzles 32b are disposed toward the second partition/passing-through member 15b at the upstream of the second partition/passing-through member 15b. Moreover, a gas supply cylindrical unit 32a is disposed between the first partition/passing-through member 15a and the second partition/passing-through member 15b. Two nozzle holes formed in the gas supply cylindrical unit 32a are disposed toward the second partition/passing-through member 15b at the downstream of the second partition/passing-through member 15b.

These nozzles and gas supply cylindrical units are connected to a common gas source 35 illustrated in FIG. 3. In addition, the nozzles and the gas supply cylindrical units will be collectively and appropriately called the gas injection unit 36. These nozzles and nozzle holes are assumed to inject gas in parallel with the table 11. Preferably, the heights of the upper edges of the nozzles and the nozzle holes from the table 11 are approximately equal to the upper edge of one article placed on the table 11.

Referring again to FIG. 5, in step S2, when the visible sensor 30 is not able to appropriately detect the articles Wa, the grasping operation and the conveying operation of the robot 20 are not performed. In this case, on the basis of the situations of articles, one of a plurality of programs for gas injection is selected and executed.

In FIG. 5, three types of programs S3 to S5 are illustrated. These programs cause the gas injection unit 36 to perform an operation for moving articles within the field of view of the visible sensor 30 such that the detection of the articles by the visible sensor 30 can be normally performed according to the situations of the articles. In other words, these programs operate the gas injection unit 36 such that a plurality of articles brought into contact with one another or adjacent to one another are dispersed and a plurality of meshed articles are separated from one another.

Figure 6A:
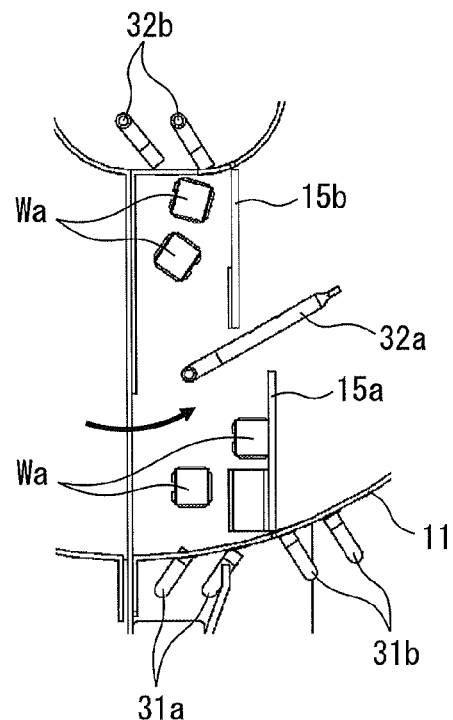
FIG. 6A is a first top view of a supply path.
Figure 6B:
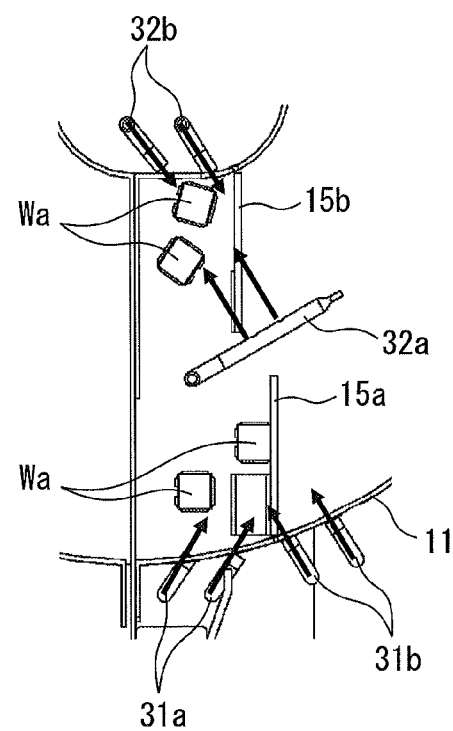
FIG. 6B is a second top view of a supply path.

Furthermore, in step S6, on the basis of the selected program, the gas injection unit 36 injects gas. FIG. 6A to FIG. 6C are top views of the supply path. Hereinafter, with reference to these drawings, a scheme for dispersing a plurality of articles adjacent to one another will be described.

As illustrated in FIG. 6A, by the rotation of the table 11, a plurality of articles Wa adjacent to each other are supplied to an upstream area of the first partition/passing-through member 15a and the second partition/passing-through member 15b.

Furthermore, as illustrated in FIG. 6B, gas is simultaneously or alternately supplied from the nozzles 31a, the nozzles 31b, the nozzle holes of the gas supply cylindrical unit 32a, and the nozzles 32b. In this way, as illustrated in FIG. 6C, the plurality of articles Wa are spaced apart from each other and are supplied downstream from first partition/passing-through member 15a and the second partition/passing-through member 15b. In other words, the gas is injected, so that the plurality of articles Wa are dispersed. In addition, in this case, it is sufficient if nozzles or nozzle holes of any one of the upstream or the downstream of the partition/passing-through member 15a are used.

Figure 7A:
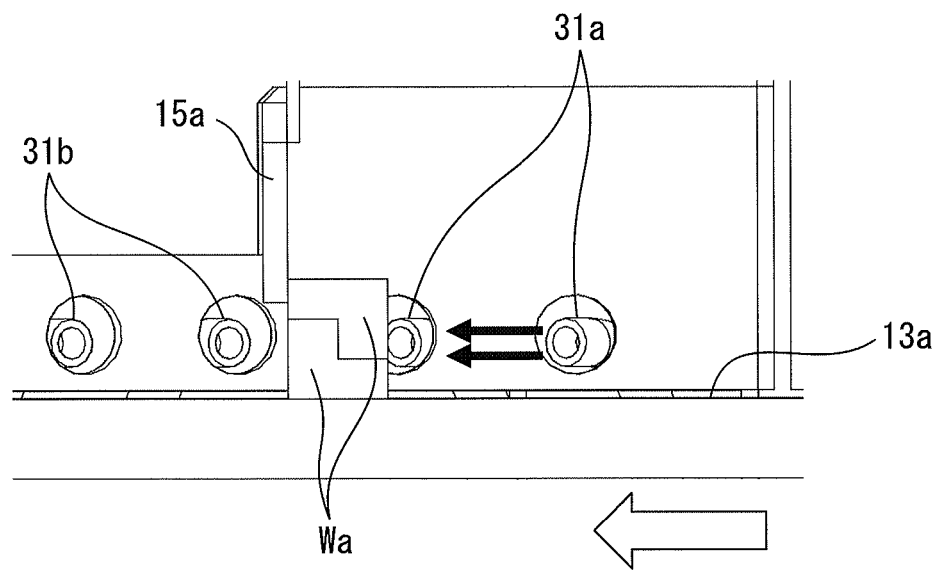
FIG. 7A is a first side view illustrating an operation of a gas injection unit.
Figure 7B:
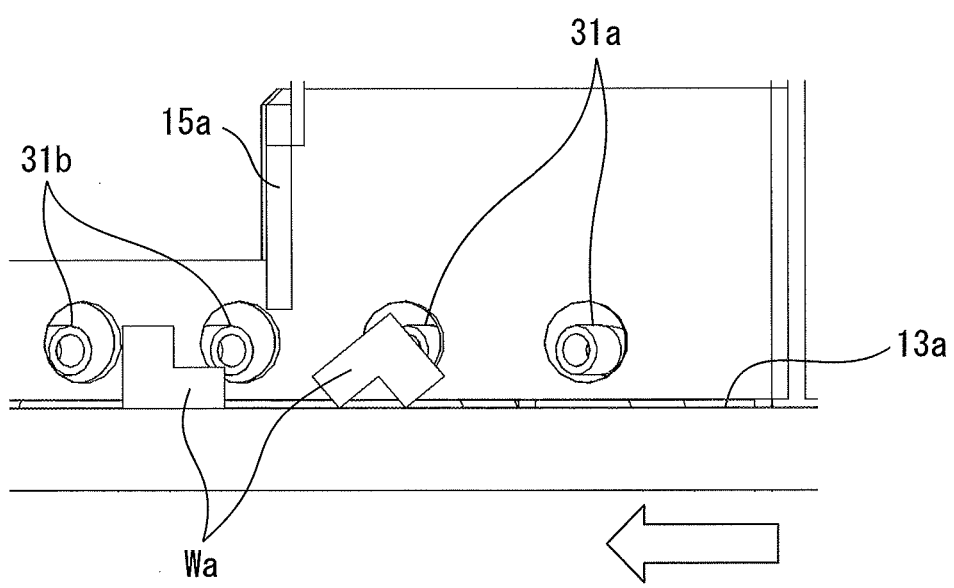
FIG. 7B is a second side view illustrating an operation of a gas injection unit.
Figure 8A:
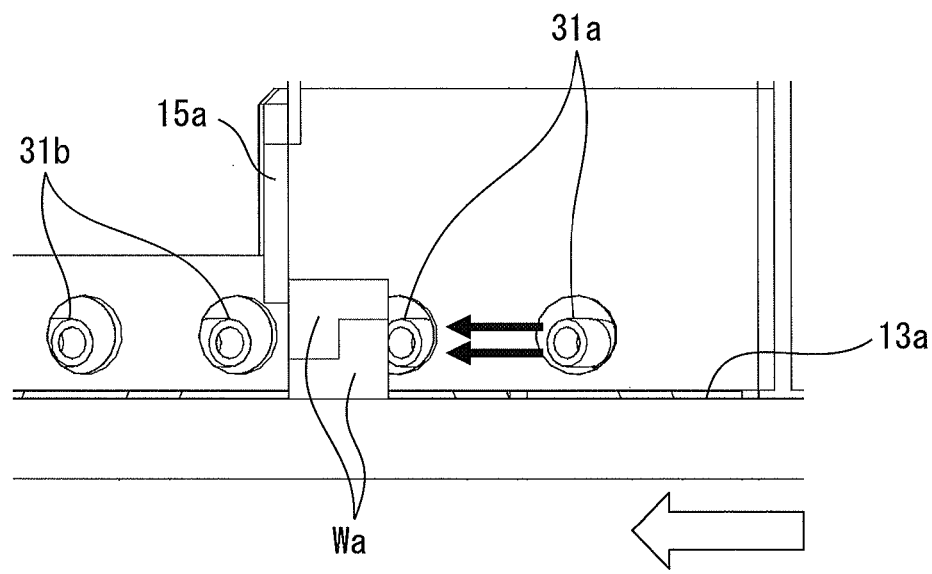
FIG. 8A is a first side view illustrating another operation of a gas injection unit.
Figure 8B:
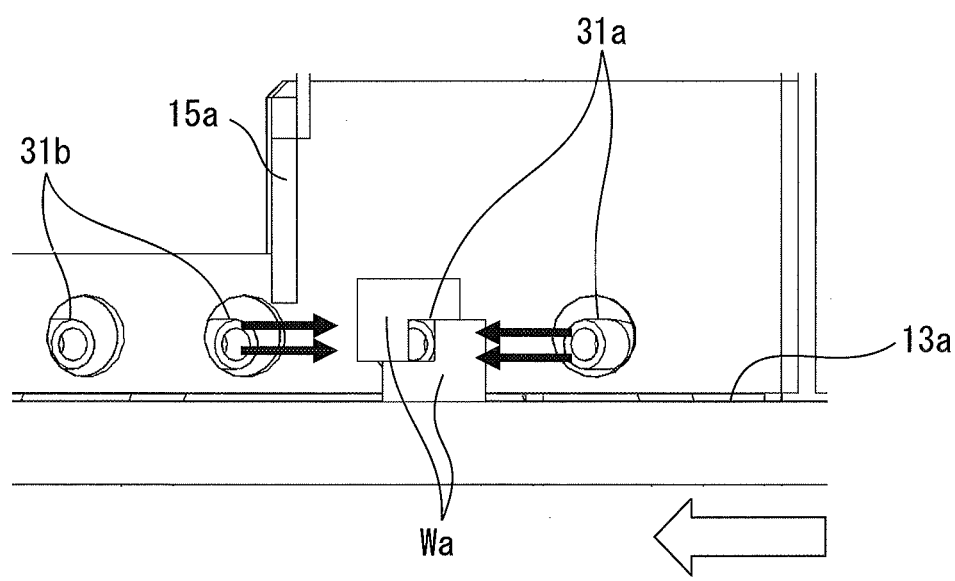
FIG. 8B is a second side view illustrating another operation of a gas injection unit.
Figure 8C:
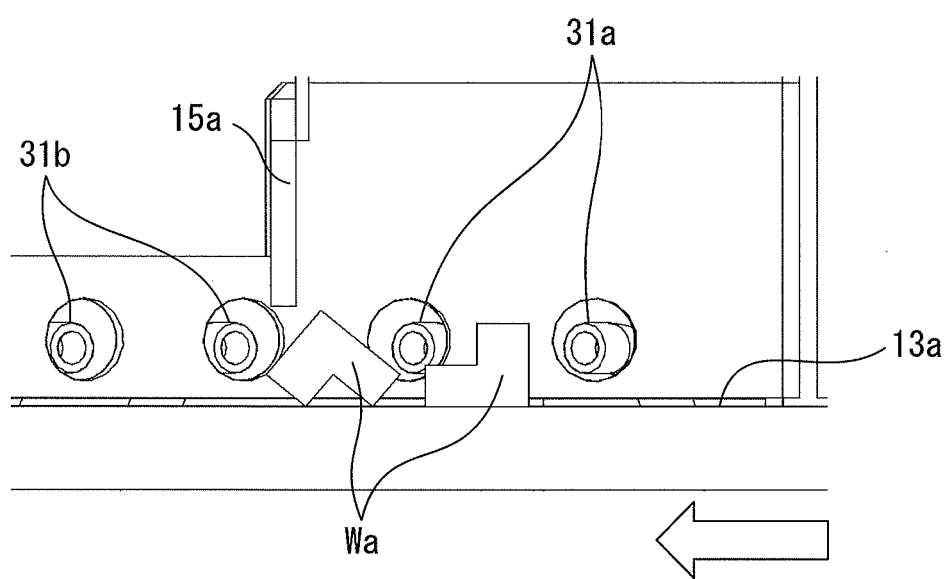
FIG. 8C is a third side view illustrating another operation of a gas injection unit.

Moreover, FIG. 7A and FIG. 7B are side views illustrating an operation of the gas injection unit, and FIG. 8A to FIG. 8C are side views illustrating another operation of the gas injection unit. Hereinafter, with reference to these drawings, a scheme for separating a plurality of meshed objects in the supply path 13 from each other will be described. Furthermore, in these drawings, it is assumed that articles are supplied from the right side to the left side as indicated by white arrows.

In FIG. 7A, two articles Wa each having an approximately L shaped section are meshed with each other to form an approximately rectangular parallelepiped. As illustrated in FIG. 7A, each of these articles Wa has two external surfaces vertical to each other, and an intersection of these external surfaces is approximately vertical to the article supply direction. Furthermore, as illustrated in FIG. 7A, the aforementioned intersection of the article Wa positioned at a lower side is positioned at a downstream side of the supply direction from the aforementioned intersection of the other article Wa positioned at an upper side.

As apparent from FIG. 7A, the height of the two meshed articles Wa is higher than the gap between the first partition/passing-through member 15a and the table 11. Consequently, since the two meshed articles Wa do not pass through the gap, it is not supplied downstream from the first partition/passing-through member 15a.

In such a case, gas is configured to be injected only from the nozzles 31a of an upstream side. In this way, the gas mainly collides with one external surface of the article Wa positioned at the upper side. In this way, as illustrated in FIG. 7B, the two meshed articles Wa are separated from each other. In addition, in such a case, since it is not necessary to use the nozzles 31b of a downstream side, the nozzles 31b of the downstream side may also be excluded.

Moreover, also in FIG. 8A, two articles Wa each having an approximately L shaped section are meshed with each other to form an approximately rectangular parallelepiped. Also in this case, an intersection of external surfaces of these articles Wa is approximately vertical to the article supply direction. However, the aforementioned intersection of the article Wa positioned at a lower side is positioned at an upstream side of the supply direction from the aforementioned intersection of the article Wa positioned at an upper side. As apparent from FIG. 8A, the two meshed articles Wa do not pass through the gap between the first partition/passing-through member 15a and the table 11.

In such a case, as illustrated in FIG. 8B, gas is alternately injected from the nozzles 31a of the upstream side and the nozzles 31b of the downstream side. When such injection is repeated by a plurality of number of times, a gap can be gradually generated between the two articles Wa. Finally, as illustrated in FIG. 8C, the two meshed articles Wa are separated from each other.

As described above, gas is injected, so that a plurality of objects brought into contact with each other or adjacent to each other are spaced apart from each other and a plurality of meshed objects are separated from each other. Referring again to FIG. 5, in step S7, the table 11 is further rotated by a predetermined amount, so that articles spaced apart from each other or objects separated from each other pass through the gaps of the partition/passing-through members 15*a* and 15*b* (see FIG. 6C, FIG. 7B, and FIG. 8C).

The operations of the gas injection unit 36 illustrated in FIG. 6A to FIG. 6C, FIG. 7A and FIG. 7B, and FIG. 8A to FIG. 8C are performed when the visible sensor 30 has detected a plurality of articles brought into contact with each other or adjacent to each other and a plurality of meshed articles. Alternatively, another sensor (not illustrated) provided in an upstream area of the partition/passing-through members 15*a* and 15*b* may also detect the plurality of articles. As described above, when the gas injection unit 36 is operated on the basis of the detection result of the visible sensor 30 or the other sensor, the injection amount of gas is minimized. Furthermore, simultaneously the injection of gas, the table 11 may be rotated in a single direction or a bi-direction by a small amount, thereby assisting the dispersion of articles. Consequently, in the present invention, it is possible to shorten a cycle time.

Alternatively, the timing at which the gas injection unit 36 injects gas may also be controlled using the timer 41 illustrated in FIG. 1. In detail, an operation for injecting gas for a predetermined injection time after a predetermined waiting time is repeated. In this case, since it is not necessary to use the detection result of a sensor in order to inject gas, it is possible to simplify the entire configuration of the system 1.

Referring again to FIG. 5, in step S8, the visible sensor 30 detects again one article Wa of the articles Wa having passed through the partition/passing-through members 15*a* and 15*b*. When the gas injection process in step S6 has been performed, a plurality of objects have been spaced apart from each other or have been separated from each other. In such a case, in step S8, the visible sensor 30 normally operates. Since an article exists within the field of view of the visible sensor 30, when the visible sensor 30 has recognized the article to normally detect the kind, the position, the orientation and the like thereof, an extraction operation of the robot 20 is performed on the basis of the information of the visible sensor 30 (step S9)

Furthermore, in step S8, when the visible sensor 30 is not able to detect again one article Wa of the articles Wa having passed through the partition/passing-through members 15*a* and 15*b*, the procedure proceeds to step S10. As described above, when the visible sensor 30 is not able to detect the article Wa continuously twice, an abnormality alarm is output in step S10. In this way, an operator recognizes that there is abnormality in the system. In addition, when the visible sensor 30 is not able to detect the article Wa continuously three times or more, it may be possible to change the setting in which the abnormality alarm is output. Furthermore, since articles not extracted by the robot return to the storage unit 12 again through the circular supply path 13, no articles stay on the supply path 13.

As described above, in the present invention, gas is injected to a plurality of articles brought into contact with one another or adjacent to one another and a plurality of meshed articles, so that these articles are dispersed. Consequently, the plurality of meshed articles are prevented from being clogged in the gaps of the partition/passing-through members 15*a* and 15*b*. In addition, in the present invention, it is possible to shorten a cycle time.

In the related art, since a plurality of articles are allowed to vibrate to disperse the articles, the surface and the like of the articles may be damaged. However, in the present invention, since articles are not dispersed by vibration, the surface and the like of the articles are not damaged.

Furthermore, in the present invention, gas is injected from the gas injection unit in parallel with the table 11. Furthermore, the heights of the upper edges of the nozzles and the nozzle holes from the table 11 are approximately equal to the upper edge of one article placed on the table 11. Consequently, the gas is injected from such nozzles and nozzle holes, so that a plurality of meshed articles are reliably dispersed. Therefore, in the present invention, since it is not necessary to change a gas injection direction and inject gas again, it is possible to shorten a cycle time.

In the present invention, articles are dispersed using gas injection. Consequently, even though a plurality of articles having various shapes are adjacent to one another, are brought into contact with one another, or are meshed with one another, it is possible to simultaneously disperse these articles. In other words, in the present invention, it is apparent that it is possible to cope with articles having various shapes.

Advantageous Effects of Invention

In a first aspect, gas is injected to a plurality of articles brought into contact with one another or adjacent to one another and a plurality of meshed articles, so that these articles are dispersed. Therefore, the plurality of meshed articles are prevented from being clogged in the gaps of the partition/passing-through members. Consequently, it is possible to shorten a cycle time. Furthermore, since articles are not dispersed by vibration, the surface and the like of the articles are not damaged.

Furthermore, since gas is injected from the gas injection unit in parallel with the supply path, a plurality of meshed articles are reliably dispersed. Therefore, since it is not necessary to change a gas injection direction and inject gas again, it is possible to shorten a cycle time.

In a second aspect, since no mechanism for positioning articles is necessary, it is possible to simplify an entire configuration of a system.

In a third aspect, since a robot is used, it is possible to flexibly cope with a change in an extraction position and an orientation of an article.

In a fourth aspect, since it is not necessary to use the detection result of a sensor in order to inject gas, it is possible to simplify an entire configuration of the system.

In an fifth aspect, since gas is injected using the detection result of the sensor, the injection amount of gas and an operation of a driving unit are minimized. Therefore, it is possible to shorten a cycle time.

In a sixth aspect, since articles not extracted by the robot return to the storage unit again through the circular supply path, no articles stay on the supply path.

In a seventh aspect, since the driving unit is a servo motor, the control of a rotation position and a high speed operation become possible.

While the present invention has been described using an exemplary embodiment, it should be understood to those skilled in the art that the aforementioned modification and various types of other modification, omission, and addition can be made without departing from the scope of the present invention.

The invention claimed is:

1. An article supply device comprising:
   a storage unit in which a plurality of articles are stored;
   a supply path that communicates with the storage unit;
   a partition that forms a predetermined vertical gap between a surface of the supply path upon which the articles are positioned and a lower edge of the partition, wherein the predetermined vertical gap is sized such that, in one orientation of the articles, the articles pass through the gap and under the lower edge of the partition, and, in another orientation of the articles, the articles do not pass through the gap and under the lower edge of the partition;
   a driving unit that allows the supply path and the partition to move relative to each other; and
   a gas injection unit that injects gas toward the partition and onto the articles on the supply path in at least one of upstream and downstream of the partition in a supply direction of the articles, wherein the gas injection unit comprises a first nozzle located upstream of the partition that injects gas towards the partition and onto the articles, and a second nozzle located downstream of the partition that injects gas towards the partition and onto the articles.

2. The article supply device according to claim 1, wherein at least one of positions and orientations of the articles supplied to the downstream of the partition is detected by an optical sensor.

3. The article supply device according to claim 1, wherein the articles supplied to the downstream of the plurality of partitions are extracted by a robot.

4. The article supply device according to claim 1, wherein a timing at which the gas injection unit injects the gas is controlled by a timer.

5. The article supply device according to claim 2, wherein a timing at which the gas injection unit injects the gas is controlled by the optical sensor that detects at least one of positions and orientations of the articles supplied to the downstream of the partition.

6. The article supply device according to claim 1, wherein the supply path is configured to be circular.

7. The article supply device according to claim 1, wherein the driving unit is a servo motor.

* * * * *